United States Patent
Nishio (10) Patent No.: US 10,503,993 B2
(45) Date of Patent: Dec. 10, 2019

(54) IMAGE PROCESSING APPARATUS

(71) Applicant: KYOCERA Document Solutions Inc., Osaka (JP)

(72) Inventor: Ken Nishio, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 253 days.

(21) Appl. No.: 15/661,394

(22) Filed: Jul. 27, 2017

(65) Prior Publication Data

US 2018/0039847 A1    Feb. 8, 2018

(30) Foreign Application Priority Data

Aug. 8, 2016 (JP) .................. 2016-155938

(51) Int. Cl.
| | | |
|---|---|---|
| *G06K 9/34* | (2006.01) | |
| *G06K 9/20* | (2006.01) | |
| *G06K 9/00* | (2006.01) | |
| *G06K 9/18* | (2006.01) | |
| *G06K 9/46* | (2006.01) | |
| *G06K 9/62* | (2006.01) | |

(52) U.S. Cl.
CPC ....... *G06K 9/2063* (2013.01); *G06K 9/00469* (2013.01); *G06K 9/18* (2013.01); *G06K 9/2081* (2013.01); *G06K 9/344* (2013.01); *G06K 9/4604* (2013.01); *G06K 9/6215* (2013.01); *G06K 2209/011* (2013.01)

(58) Field of Classification Search
CPC ......... G06K 2209/011; G06K 9/00442; G06K 9/00469; G06K 9/18; G06K 9/2063; G06K 9/2081; G06K 9/3275; G06K 9/344; G06K 9/4604; G06K 9/50; G06K 9/6215
See application file for complete search history.

(56) References Cited

U.S. PATENT DOCUMENTS

| | | | | |
|---|---|---|---|---|
| 4,105,998 A | * | 8/1978 | Yoshida | G06K 9/50 382/200 |
| 6,043,823 A | * | 3/2000 | Kodaira | G06K 9/00469 345/619 |
| 6,339,651 B1 | * | 1/2002 | Tian | G06K 9/344 340/10.1 |

(Continued)

FOREIGN PATENT DOCUMENTS

JP    2004-166062 A    6/2004

*Primary Examiner* — Bhavesh M Mehta
*Assistant Examiner* — Ian L Lemieux
(74) *Attorney, Agent, or Firm* — IP Business Solutions, LLC (57) ABSTRACT

An image processing apparatus includes a control unit. The control unit performs OCR processing by identifying a specified area of image data as a detection area, detecting line images contained in the detection area, and analyzing the detected line images to identify a character represented by the line images. Furthermore, when failing to identify a character represented by the line images in the OCR processing, the control unit determines whether the line images represent a part of a character and, upon determination that the line images represent a part of a character, expands the detection area in a direction where the other part of the character to be identified is assumed to be present and performs the OCR processing again on the expanded detection area.

7 Claims, 9 Drawing Sheets

(56) References Cited

U.S. PATENT DOCUMENTS

| | | | | |
|---|---|---|---|---|
| 6,360,011 B1* | 3/2002 | Katsumata | ......... | G06K 9/00449 382/181 |
| 8,831,329 B1* | 9/2014 | Kumar | ..................... | G06K 9/18 382/139 |
| 2006/0143154 A1* | 6/2006 | Jager | ....................... | G06F 16/93 |
| 2012/0120444 A1* | 5/2012 | Hirohata | ............ | G06K 9/00449 358/1.15 |
| 2013/0315484 A1* | 11/2013 | Shibata | .............. | G06K 9/00469 382/179 |
| 2014/0161365 A1* | 6/2014 | Acharya | .............. | G06K 9/3283 382/229 |
| 2014/0168478 A1* | 6/2014 | Baheti | .................. | G06K 9/2081 348/240.99 |
| 2016/0005203 A1* | 1/2016 | Kawasaki | ................ | G06T 11/60 382/163 |
| 2016/0014299 A1* | 1/2016 | Saka | .................. | G06K 9/00456 358/1.2 |
| 2016/0283786 A1* | 9/2016 | Imoto | ................. | G06K 9/00409 |
| 2017/0372163 A1* | 12/2017 | Ray | ...................... | G06K 9/4604 |
| 2018/0285638 A1* | 10/2018 | Lelore | ................ | G06K 9/00416 |

* cited by examiner

FIRST ROW:
たい場合は、表示される確認画面ではいを押

OCR

SECOND ROW:
たい場合は、表示される確認画面ではいを押

EXPAND DETECTION AREA

THIRD ROW:
たい場合は、表示される確認画面ではいを押

FIRST ROW:
第32回〇〇市花火大会は、8月3日に行い — m4

↓ OCR

SECOND ROW:
第32回〇〇市花火大会は、8月3日に行い — b4, m4, b3

↓ EXPAND DETECTION AREA

THIRD ROW:
第32回〇〇市花火大会は、8月3日に行い — b4, m4, b5, b3

EXPAND DETECTION AREA

Fig.9

IMAGE PROCESSING APPARATUS

INCORPORATION BY REFERENCE

This application claims priority to Japanese Patent Application No. 2016-155938 filed on 8 Aug. 2016, the entire contents of which are incorporated by reference herein.

BACKGROUND

The present disclosure relates to image processing apparatuses and image processing methods and particularly relates to an OCR (optical character recognition) processing technique for extracting characters from image data.

There is known a technique for performing OCR processing on a specified area, not the whole, of image data to extract characters presented in the specified area. Using the OCR processing, the user can extract desired characters by specifying a desired area.

An example of a method for specifying an area where OCR processing is to be performed is a method in which the user places a mark on a desired area of a document with a marker pen. The area where OCR processing is to be performed can be specified by scanning the marked document and analyzing image data generated by the scanning of the document to identify a marked portion of the document. According to this technique, the user can specify the area where OCR processing is to be performed by an intuitive and simple operation of placing a mark on the document by hand.

SUMMARY

A technique improved over the above technique is proposed herein as one aspect of the present disclosure.

An image processing apparatus according to an aspect of the present disclosure includes a control unit. The control unit performs OCR processing by identifying a specified area of image data as a detection area, detecting line images contained in the detection area, and analyzing the detected line images to identify a character represented by the line images. Furthermore, when failing to identify a character represented by the line images in the OCR processing, the control unit determines whether the line images represent a part of a character and, upon determination that the line images represent a part of a character, expands the detection area in a direction where the other part of the character to be identified is assumed to be present and performs the OCR processing again on the expanded detection area.

An image processing method according to another aspect of the present disclosure includes:

the step of performing OCR processing by identifying a specified area of image data as a detection area, detecting line images contained in the detection area, and analyzing the detected line images to identify a character represented by the line images; and the step of, upon failure to identify a character represented by the line images in the OCR processing, determining whether the line images represent a part of a character and, upon determination that the line images represent a part of a character, expanding the detection area in a direction where the other part of the character to be identified is assumed to be present and performing the OCR processing again on the expanded detection area.

DETAILED DESCRIPTION

Hereinafter, a description will be given of an image forming apparatus, which is an example of an image processing apparatus according to one embodiment of the present disclosure, with reference to the drawings.

Figure 1:
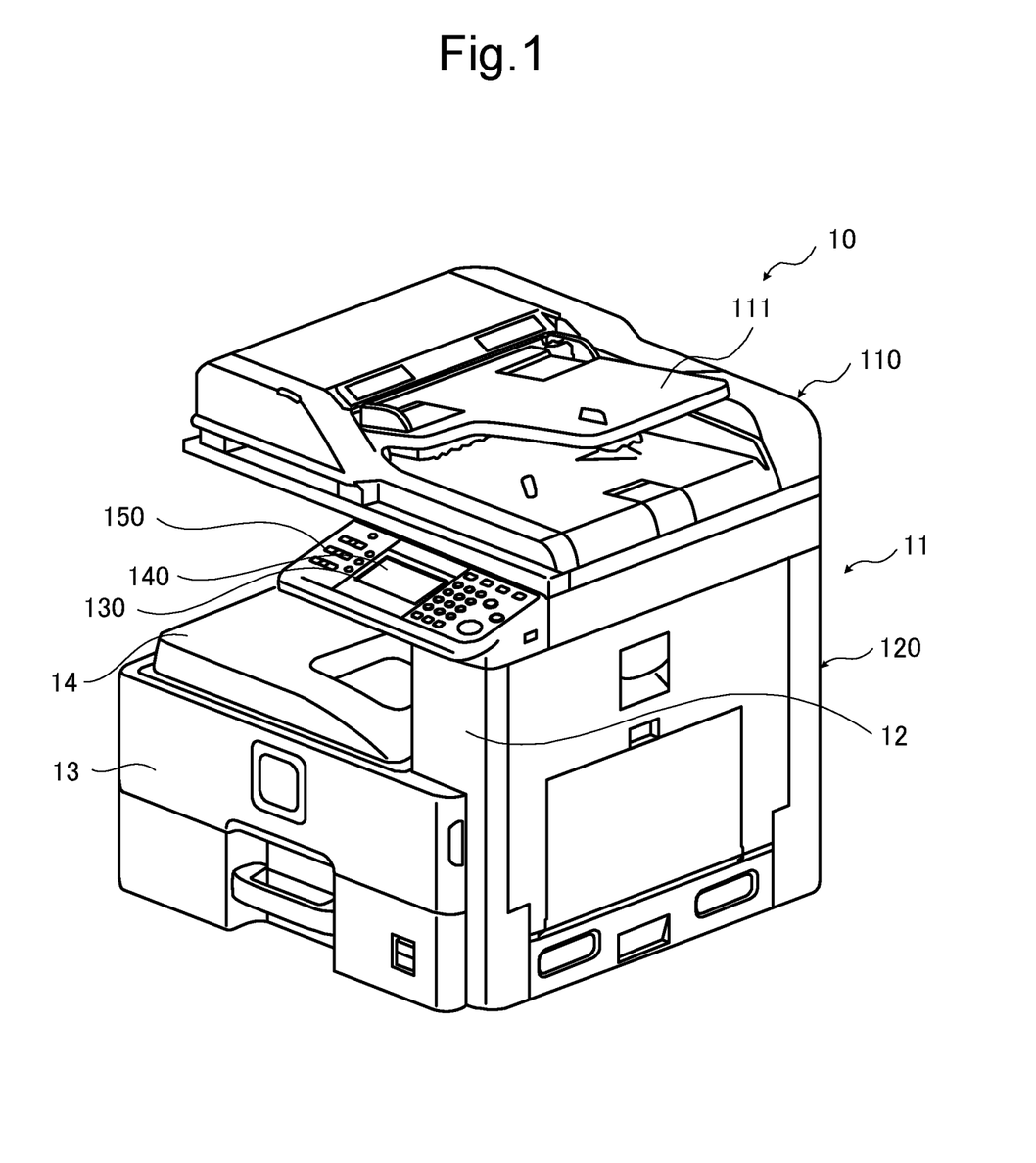
FIG. 1 is a perspective view showing an image forming apparatus according to one embodiment of the present disclosure.
Figure 2:
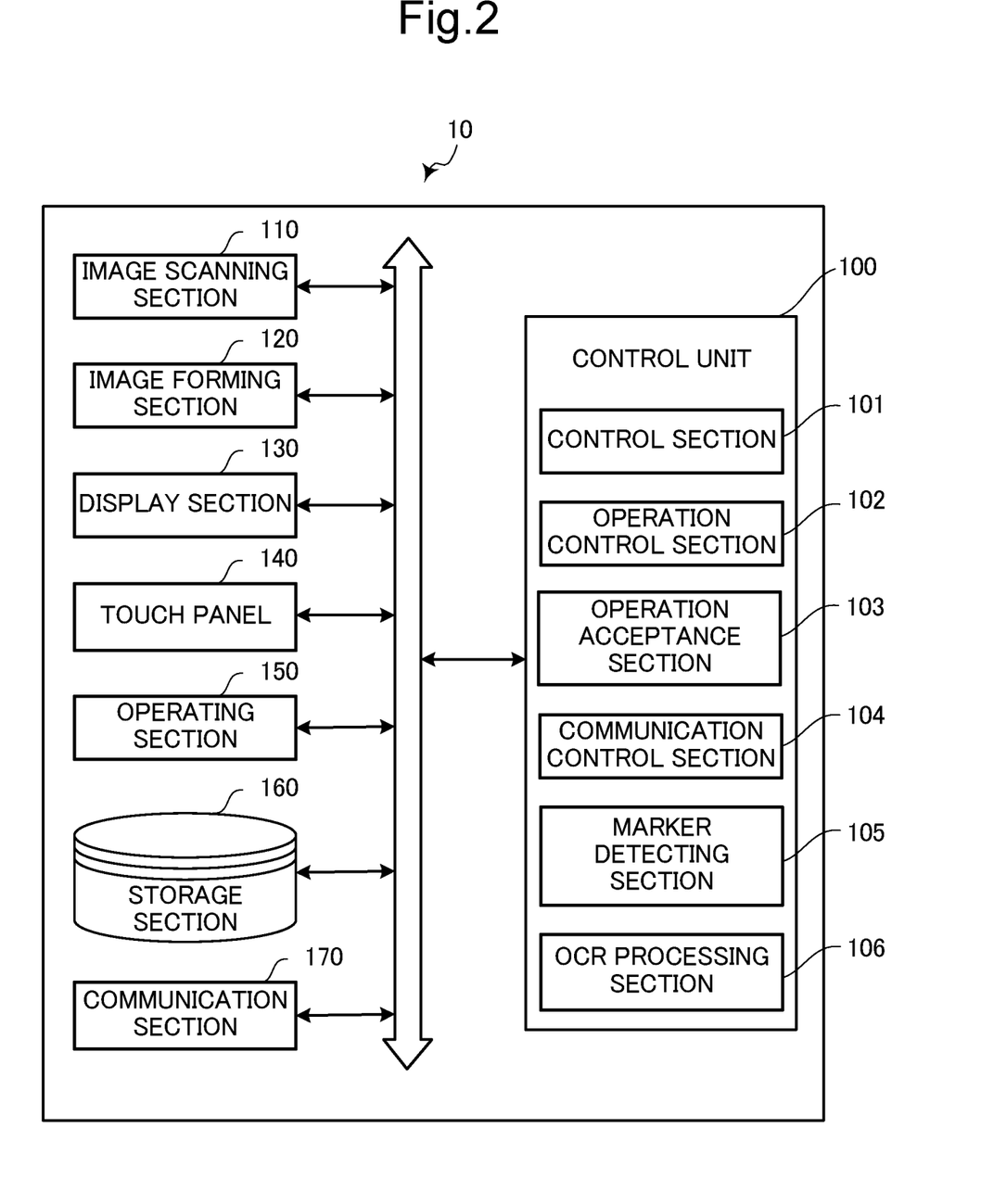
FIG. 2 is a block diagram showing an internal configuration of the image forming apparatus according to the one embodiment of the present disclosure.

FIG. 1 is a perspective view showing an image forming apparatus according to one embodiment of the present disclosure. FIG. 2 is a block diagram showing an internal configuration of the image forming apparatus.

The image forming apparatus 10 is a multifunction peripheral having multiple functions including, for example, a copy function, a print function, a scan function, and a facsimile function. The image forming apparatus 10 is roughly composed of an apparatus body 11, an image scanning section 110 disposed above the apparatus body 11, and a connecting portion 12 provided between the image scanning section 110 and the apparatus body 11.

The apparatus body 11 is made up to include an image forming section 120, a sheet feed section 13, and so on.

In an image scanning operation of the image forming apparatus 10, under the control of an operation control section 102 to be described hereinafter, the image scanning section 110 (image data acquisition section) scans a stack of document sheets placed on a document loading chute 111 one sheet after another to generate (acquire) image data formed of a plurality of pages. The image data is stored in a storage section 160. Instead of acquiring image data in a manner that the image scanning section 110 scans a stack of document sheets, the image forming apparatus 10 may acquire image data representing a document in a manner that a communication section 170 receives the image data from another information processing apparatus, such as a PC (personal computer).

In an image forming operation of the image forming apparatus 10, under the control of the operation control section 102, the image forming section 120 forms a toner image on a recording paper sheet fed from the sheet feed section 13 based on image data stored in the storage section 160 or other image data. Thereafter, the toner image formed on the recording paper sheet is heat fixed by an unshown fixing section. The recording paper sheet having an image fixed thereon by the completion of the fixing is discharged to a sheet output tray 14.

A display section 130 and an operating section 150 are disposed at the front of a housing forming a shell of the image forming apparatus 10. The display section 130 is formed to include a liquid crystal display (LCD) or an organic light-emitting diode (OLED) display. The display section 130 displays a menu screen or other screens under the control of the operation control section 102.

A touch panel 140 is disposed in front of the display section 130. The touch panel 140 is a touch panel of, for example, a so-called resistive film system or a capacitance system and detects a user's touch of the touch panel 140 together with the point of touch.

The operating section 150 is hard keys including, for example, a menu key for calling up a menu, arrow keys for moving the focus of a GUI forming the menu, a determination key for performing a determination operation for the GUI forming the menu, and so on.

The storage section 160 is a large storage device, such as an HDD.

The communication section 170 is a network interface composed of a communication module, such as a wireless LAN board.

The image forming apparatus 10 further includes a control unit 100. The control unit 100 is formed of a CPU (central processing unit), a RAM (random access memory), a ROM (read only memory), and so on. When a program stored in the above ROM or the storage section 160 is executed by the above CPU, the control unit 100 functions as a control section 101, an operation control section 102, an operation acceptance section 103, a communication control section 104, a marker detecting section 105, and an OCR processing section 106. Alternatively, each constituent section of the control unit 100 may not be implemented by the operation of the control unit 100 in accordance with the program but may be constituted by a hardware circuit.

The control section 101 governs the overall operation control of the image forming apparatus 10.

The operation acceptance section 103 has the function to accept, based on a detection signal output from the touch panel 140, a user's gesture on the touch panel 140. Furthermore, the operation acceptance section 103 also has the function to accept a user's operation using the operating section 150, such as a hard key.

The communication control section 104 has the function to control the communication operation of the communication section 170. The communication section 170 sends, under the control of the communication control section 104, image data to another information processing apparatus, such as a PC.

The operation control section 102 has the function to control the image scanning operation of the image scanning section 110, the display operation of the display section 130, and other operations.

The marker detecting section 105 has the function to analyze image data acquired by the scanning of a document by the image scanning section 110 to detect a marker portion placed on the document with a marker pen.

The OCR processing section 106 has the function to identify, in image data acquired by the scanning of a document by the image scanning section 110, an area defined by the marker portion detected by the marker detecting section 105, as a detection area to be subjected to OCR processing and perform OCR processing on the identified detection area, thus extracting characters in the detection area.

Specifically, the OCR processing section 106 identifies, as the above detection area, an area present on a marker portion detected by the marker detecting section 105 or an area enclosed by a marker portion detected by the marker detecting section 105. Then, the OCR processing section 106 performs edge detection on the detection area to detect lines (line images) contained in the detection area. Meanwhile, the storage section 160 contains a character database that includes positional information on the loci and relative positions of line segments forming each of various characters, such as hiragana, katakana, kanji, and alphabetical characters, (inclusive of information on the positions of intersections between lines, information on the positions of end points of lines, and information on vectorization of line loci). The OCR processing section 106 refers to the character database stored in the storage section 160 to detect a character formed of the lines detected in the above manner. More specifically, the OCR processing section 106 calculates the degree of similarity of each character contained in the character database to the detected line images based on the loci and relative positions of the line segments and identifies as a character represented by the line images a character the calculated degree of similarity of which is equal to or greater than a predetermined first value.

Figure 3:
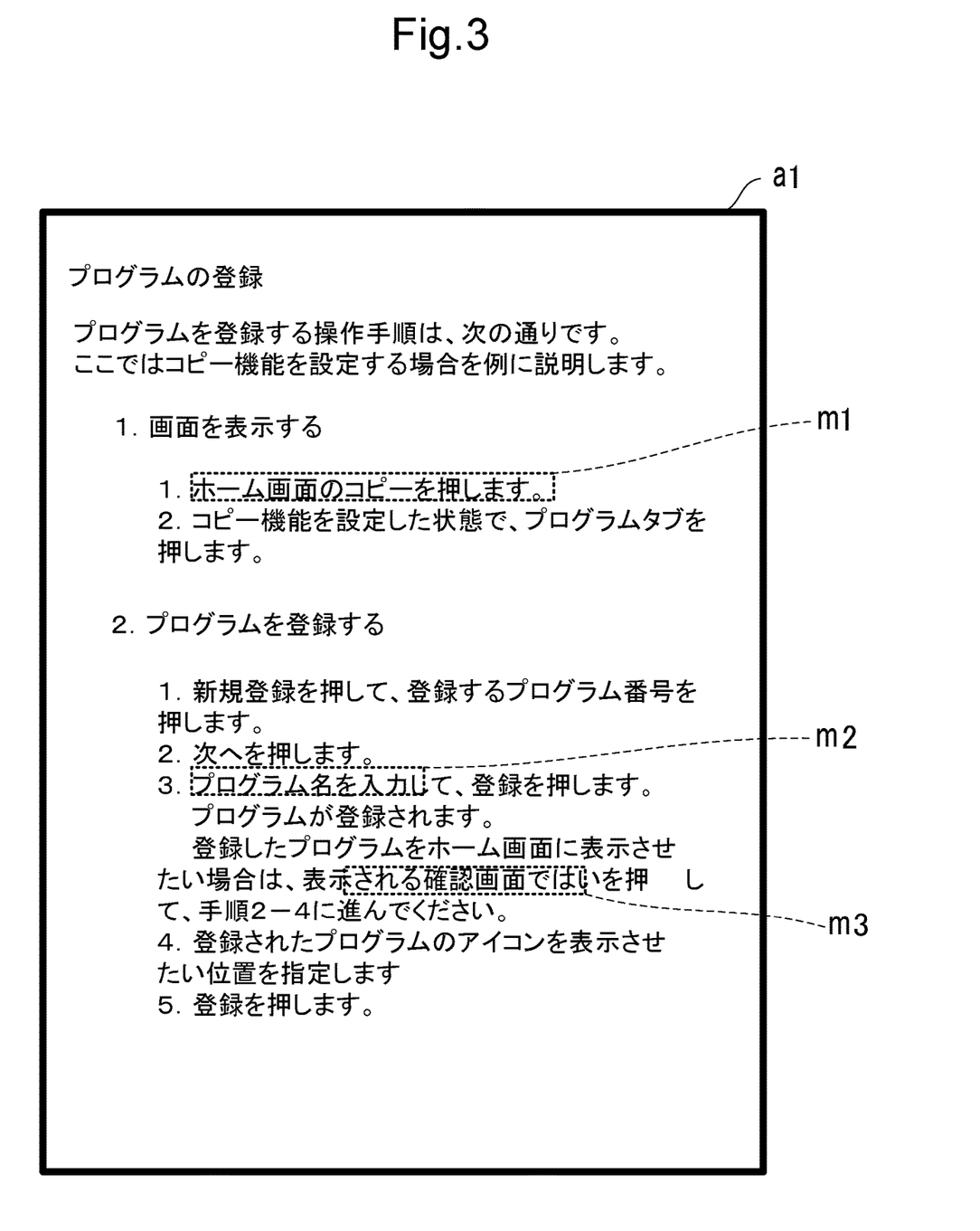
FIG. 3 is a view showing an example of a document to be processed by the image forming apparatus according to the one embodiment of the present disclosure.

FIG. 3 is a view showing an example of a document to be processed by the image forming apparatus 10. The document a1 contains a plurality of marker portions m1 to m3 placed with a marker pen. The image scanning section 110 scans the document a1 and generates image data of the scanned document a1. Then, the marker detecting section 105 extracts the marker portions m1 to m3 from the generated image data and the OCR processing section 106 performs OCR processing on areas on the marker portions m1 to m3 which are detection areas.

Figure 4:
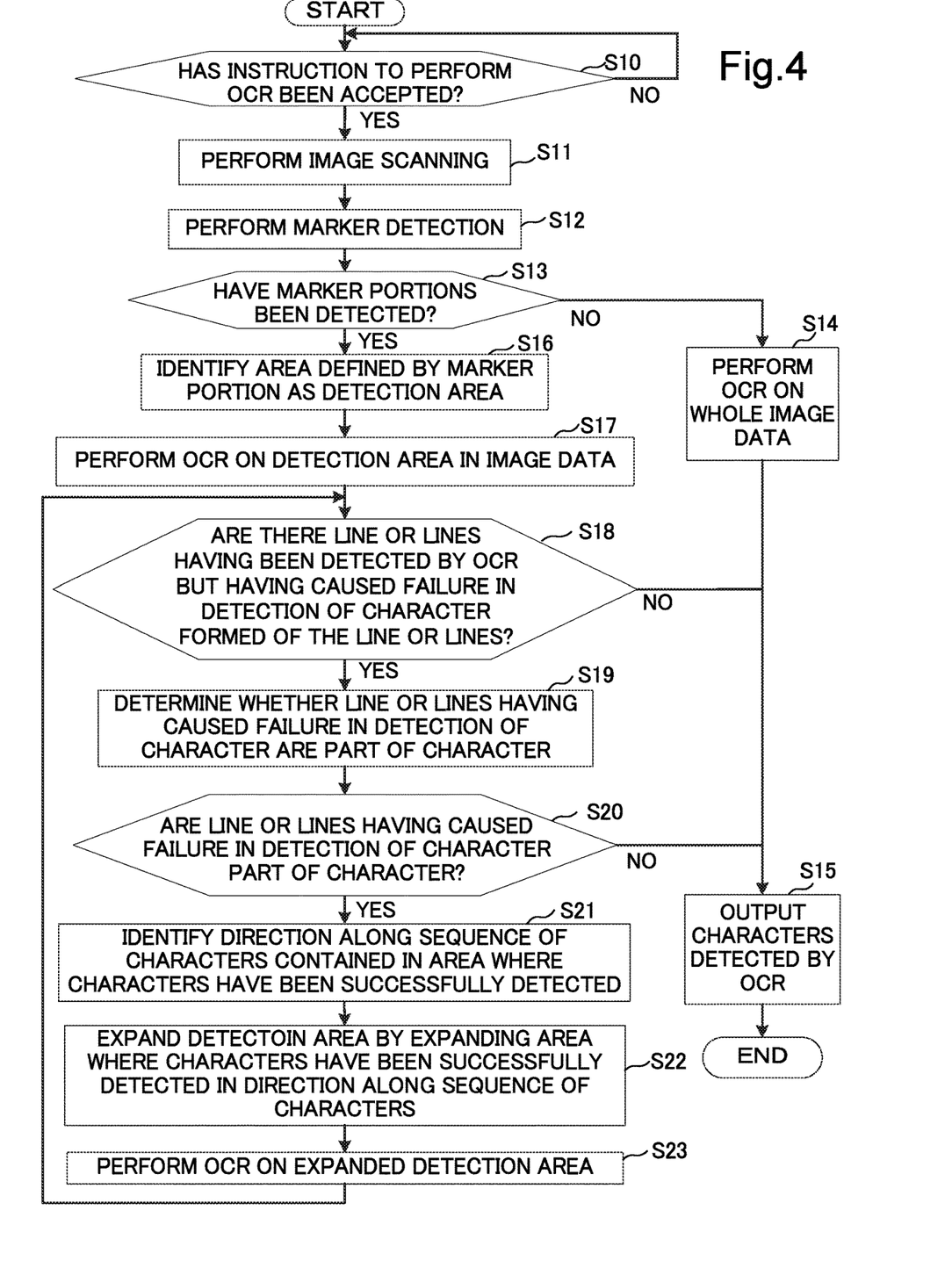
FIG. 4 is a flowchart showing an operation flow of the image forming apparatus according to the one embodiment of the present disclosure.

Next, a description will be given of the image scanning operation of the image forming apparatus 10 having the above configuration. FIG. 4 is a flowchart showing an operation flow of the OCR processing of the image forming apparatus 10.

When the operation acceptance section 103 accepts an instruction to scan the image of a document (YES in step S10), the operation control section 102 controls the image scanning section 110 to perform image scanning processing (step S11). As a result of the processing in step S11, the image scanning section 110 acquires image data representing the document.

The marker detecting section 105 performs marker detection processing for analyzing the image data acquired by the image scanning section 110 in the processing in step S11 to detect marker portions contained in the image data (step S12).

When no marker portion is detected (NO in step S13), the OCR processing section 106 identifies the whole of the image data as a detection area and performs OCR processing on the whole image data (step S14). Then, the OCR processing section 106 performs output processing for outputting characters extracted by the OCR processing in step S14 (step S15). For example, the OCR processing section 106 performs, as the above output processing, processing for allowing the storage section 160 to store the extracted characters, processing for allowing the communication section 170 to send the extracted characters to another information processing apparatus, such as a PC, or processing for allowing the display section 130 to display the extracted characters.

When any marker portion is detected (YES in step S13), the OCR processing section 106 identifies an area defined by the marker portion as a detection area (step S16) and performs OCR processing on the detection area (step S17).

In the OCR processing, the detection area is subjected to edge detection, so that lines contained in the detection area are detected. When, in doing so, characters associated with all the detected lines have been successfully detected (identified) (NO in step S18), the OCR processing section 106 performs the output processing for outputting the detected characters in step S15.

On the other hand, when there are a line or lines that have been detected in the OCR processing but have caused failure in detection (identification) of any character formed of the detected line or lines (YES in step S18), the OCR processing section 106 determines whether or not the line or lines having caused failure in detection of any character are a part of a character (step S19).

In the processing in step S19, the OCR processing section 106 refers to the above-described positional information on the positions of line segments forming each character, the positional information being contained in the character database stored in the storage section 160, and calculates the degree of similarity of each character contained in the character database to the line or lines having caused failure in detection of any character. When the database contains a character the calculated degree of similarity of which is equal to or greater than a predetermined second value smaller than the aforementioned first value, the OCR processing section 106 determines that the line or lines having caused failure in detection of any character constitute a part of a character. On the other hand, when the database contains no character the calculated degree of similarity of which is equal to or greater than the predetermined second value, the OCR processing section 106 determines that the line or lines having caused failure in detection of any character do not constitute a part of any character.

When the line or lines having caused failure in detection of any character do not constitute a part of any character (NO in step S20), the OCR processing section 106 performs the output processing for outputting the detected characters in step S15.

On the other hand, when the line or lines having caused failure in detection of any character constitute a part of a character (YES in step S20), the OCR processing section 106 identifies a direction along a sequence of characters contained in an area where the characters have been successfully detected (step S21). Then, the OCR processing section 106 expands the detection area by expanding the area where the characters have been successfully detected in the direction along the sequence of the characters (step S22) and performs OCR processing again on the expanded detection area (step S23).

Figure 5:
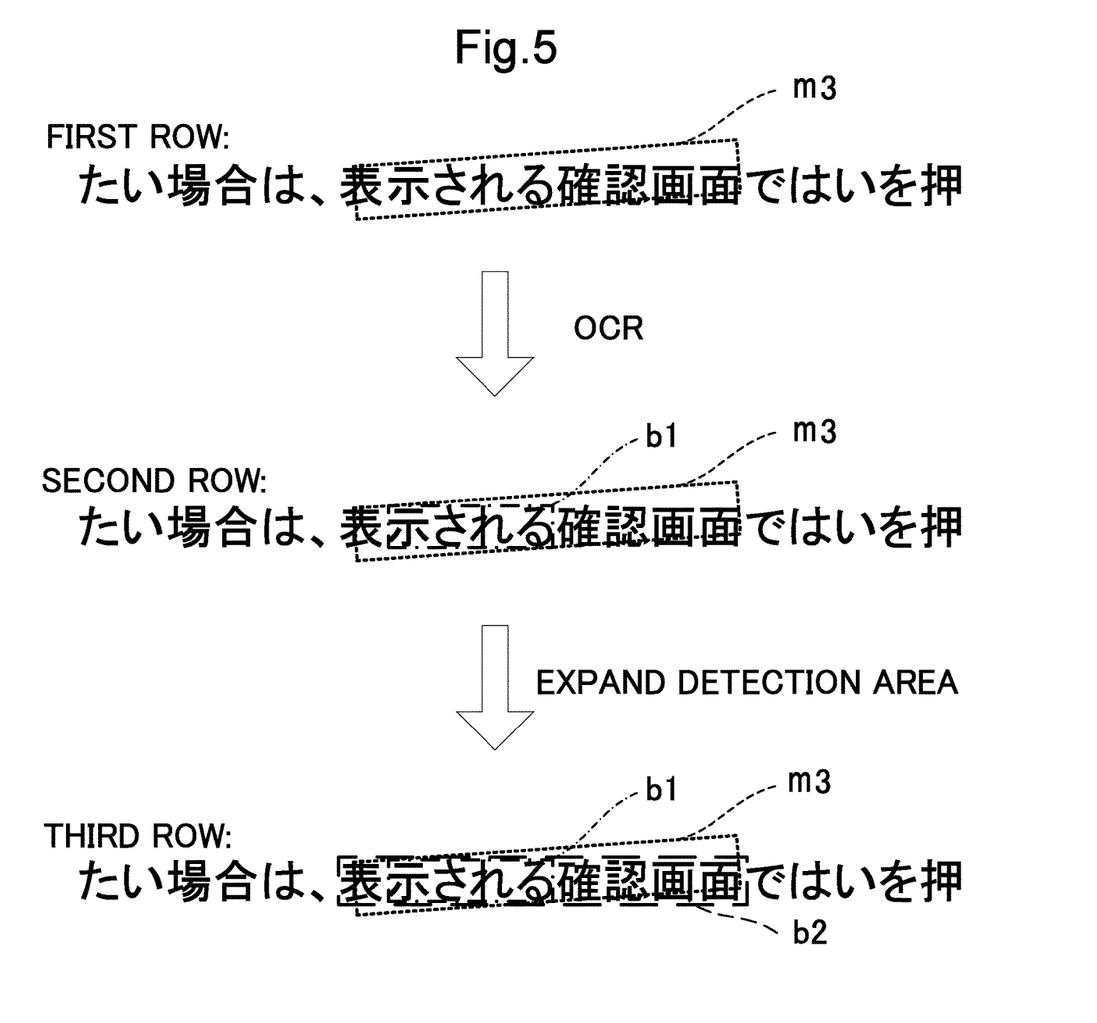
FIG. 5 is a view showing examples of a marker portion, a detection area, and an expanded detection area.

Steps S16 to S23 will be described in further detail with reference to FIG. 5. FIG. 5 is a view showing examples of a marker portion, a detection area, and an expanded detection area.

Because placing a marker portion (marking) with a marker pen is made by user's drawing by hand, the marker portion may be carelessly placed so that the bounds indicated by the marker portion overlap with a character. In the example shown in FIG. 5, as shown in the first row, a marker portion m3 is placed at an angle to the sequence of characters. As a result, the bounds indicated by the marker portion m3 do not overlap with a character string "示される" but overlap with a character "表" and a character string "確認画面".

When performing OCR processing on the area defined by the marker portion m3 shown in the first row of FIG. 5, the OCR processing section 106 successfully detects the character string "示される". As a result, an area defined by the dot-and-dash line b1 shown in the second row of FIG. 5 becomes an area where characters have been successfully detected. On the other hand, the detection of the character "表" and the character string "確認画面" is failed.

In this case, the OCR processing section 106 expands the area b1 where characters have been successfully detected in the direction along the sequence of the characters "示される" contained in the area b1. As a result, an area defined by the broken line b2 shown in the third row of FIG. 5 becomes a new detection area. The OCR processing section 106 performs OCR processing again on the new detection area b2. Because the bounds of the new detection area b2 do not overlap with the character "表" and the character string "確認画面", the OCR processing section 106 can detect the characters "表" and "確認画面", which could not be detected in the initial OCR processing.

The above description has been given of, for example, a configuration of the OCR processing section 106 in which the OCR processing section 106 performs OCR processing again (a second round of OCR processing) on the new detection area b2 and detects characters using OCR data (line image data) obtained by the second round of OCR processing. However, this embodiment is not limited to this configuration. For example, the OCR processing section 106 may be configured to perform the second round of OCR processing only on an expanded portion, i.e., only on a portion of the new detection area b2 other than the area b1 where characters have been successfully detected, and detect characters by uniting OCR data obtained by the second round of OCR processing and the OCR data having already been obtained by the initial OCR processing on the area before being expanded, i.e., the above area b1. In this case, the OCR processing section 106 can efficiently detect characters.

Referring back to FIG. 4, after the processing in step S23, the OCR processing section 106 performs the processing in step S18 again. When the expanded detection area contains a line or lines that have been detected in the OCR processing but have caused failure in detection of any character formed of the detected line or lines (YES in step S18), the OCR processing section 106 performs the processing in steps S19 to S23 again. On the other hand, when characters associated with all the detected lines in the expanded detection area have been successfully detected (NO in step S18), the OCR processing section 106 performs the output processing for outputting the detected characters in step S15.

In the case of a general image forming apparatus (image processing apparatus), in specifying the area where OCR processing is to be performed by the act of drawing a mark on a document by hand, the user may carelessly draw the mark to overlap the mark with characters. In this case, since the area where OCR processing is to be performed is specified to overlap with characters, all the characters in a user's desired area may not be able to be extracted.

Unlike the general image forming apparatus, in the image forming apparatus 10 according to the above embodiment, even if the area where OCR processing is to be performed is specified to overlap with characters by a user's careless act, all the characters in the user's desired area can be extracted.

The present disclosure is not limited to the configurations of the above embodiment and can be modified in various ways.

Modification 1

Figure 6:
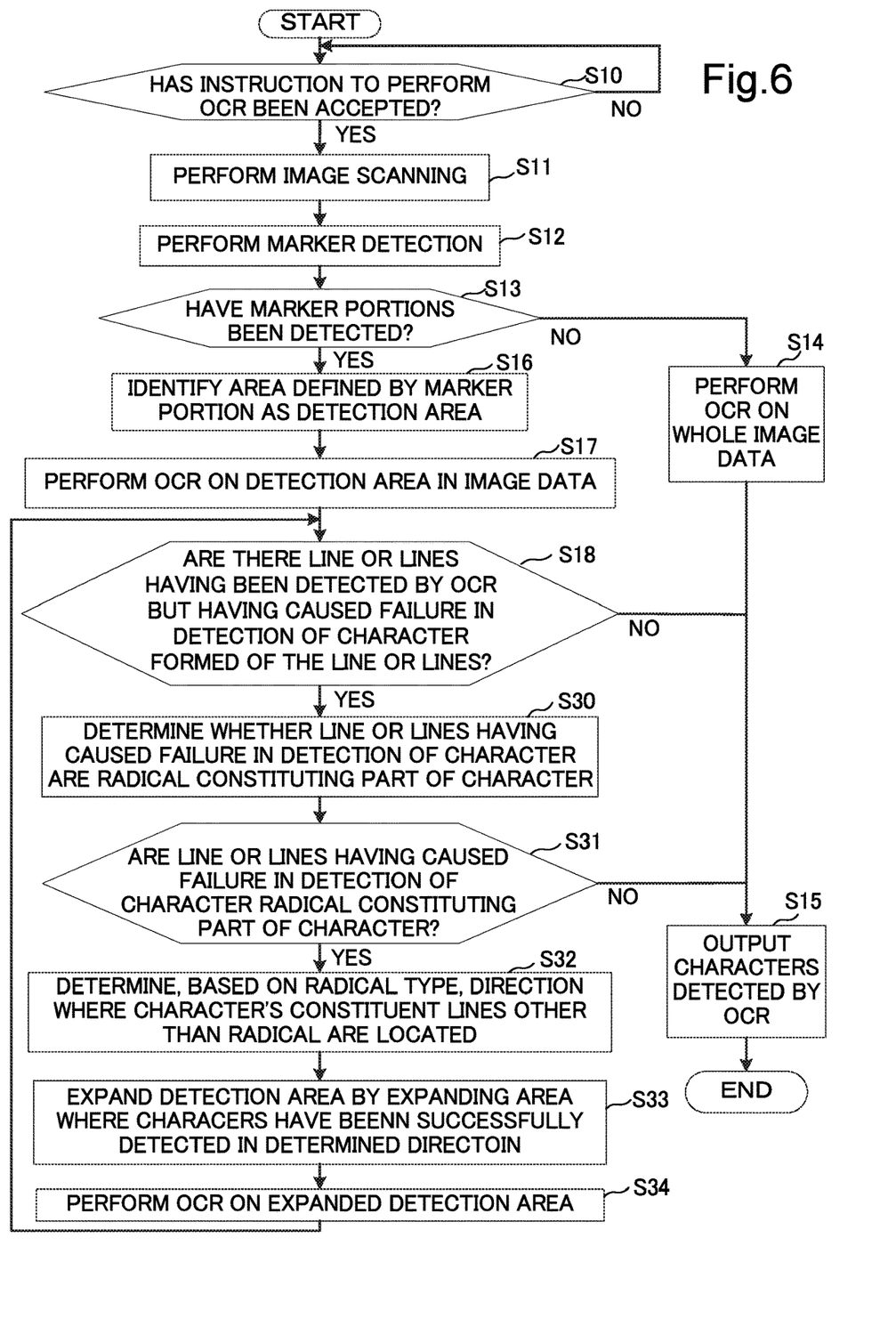
FIG. 6 is a flowchart showing an operation flow of an image forming apparatus according to a modification.

FIG. 6 is a flowchart showing an operation flow of OCR processing of an image forming apparatus according to Modification 1. The same steps of processing as those in the flowchart shown in FIG. 4 are designated by the same references and further explanation thereof will be omitted.

In the image forming apparatus according to Modification 1, when there are a line or lines that have been detected in the initial OCR processing but have caused failure in detection of any character formed of the detected line or lines (YES in step S18), the OCR processing section 106 performs processing in step S30.

Meanwhile, the storage section 160 contains, in addition to the character database described previously, a character element database that includes positional information on the loci and relative positions of line segments forming each of elements making up characters (inclusive of information on the positions of intersections between lines, information on the positions of end points of lines, and information on vectorization of line loci). For example, elements making up characters are radicals (called "bushu" in Japanese) making up kanji, including hen, tsukuri, kanmuri, ashi, kamae, tare, and nyou radicals. In other words, "radical (bushu)" is a generic term for components making up kanji characters. Hen is, among components making up a kanji character, a component at the left side of the kanji character. Tsukuri is, among components making up a kanji character, a component at the right side of the kanji character. Kanmuri is, among components making up a kanji character, a component at the top of the kanji character. Ashi is, among components making up a kanji character, a component at the bottom of the kanji character. Kamae is, among components making up a kanji character, a component enclosing the other components of the kanji character. Tare is, among components making up a kanji character, a component having a shape extending along the top side of the kanji character and hanging down from the top left to the left side of the kanji character. Nyou is, among components making up a kanji character, a component having a shape extending along from the left side to the bottom side of the kanji character.

In the processing in step S30, the OCR processing section 106 refers to the positional information on the positions of line segments forming each radical, the positional information being contained in the character element database stored in the storage section 160, and calculates the degree of similarity of each radical contained in the character element database to the line or lines having caused failure in detection of any character. When the database contains a radical the calculated degree of similarity of which is equal to or greater than a predetermined third value, the OCR processing section 106 determines that the line or lines having caused failure in detection of any character constitute a radical and constitute a part of a character. On the other hand, when the database contains no radical the calculated degree of similarity of which is equal to or greater than the predetermined third value, the OCR processing section 106 determines that the line or lines having caused failure in detection of any character do not constitute any radical and do not constitute a part of any character.

When the line or lines having caused failure in detection of any character do not constitute any radical (NO in step S31), the OCR processing section 106 performs the output processing for outputting the detected characters in step S15.

On the other hand, when the line or lines having caused failure in detection of any character constitute a radical (YES in step S31), the OCR processing section 106 identifies, based on the type of the radical, a direction in which the kanji's constituent lines other than the radical are located (step S32). For example, when the detected radical is kanmuri, such as ukanmuri, the OCR processing section 106 determines that the kanji's constituent lines other than the radical are located under the radical. For another example, when the detected radical is hen, such as sanzui, the OCR processing section 106 determines that the kanji's constituent lines other than the radical are located on the right of the radical.

After the processing in step S32, the OCR processing section 106 expands the detection area by expanding the area where the characters have been successfully detected in the OCR processing in step S17 in the direction identified in the processing in step S32 (step S33) and performs OCR processing again on the expanded detection area (step S34).

Figure 7:
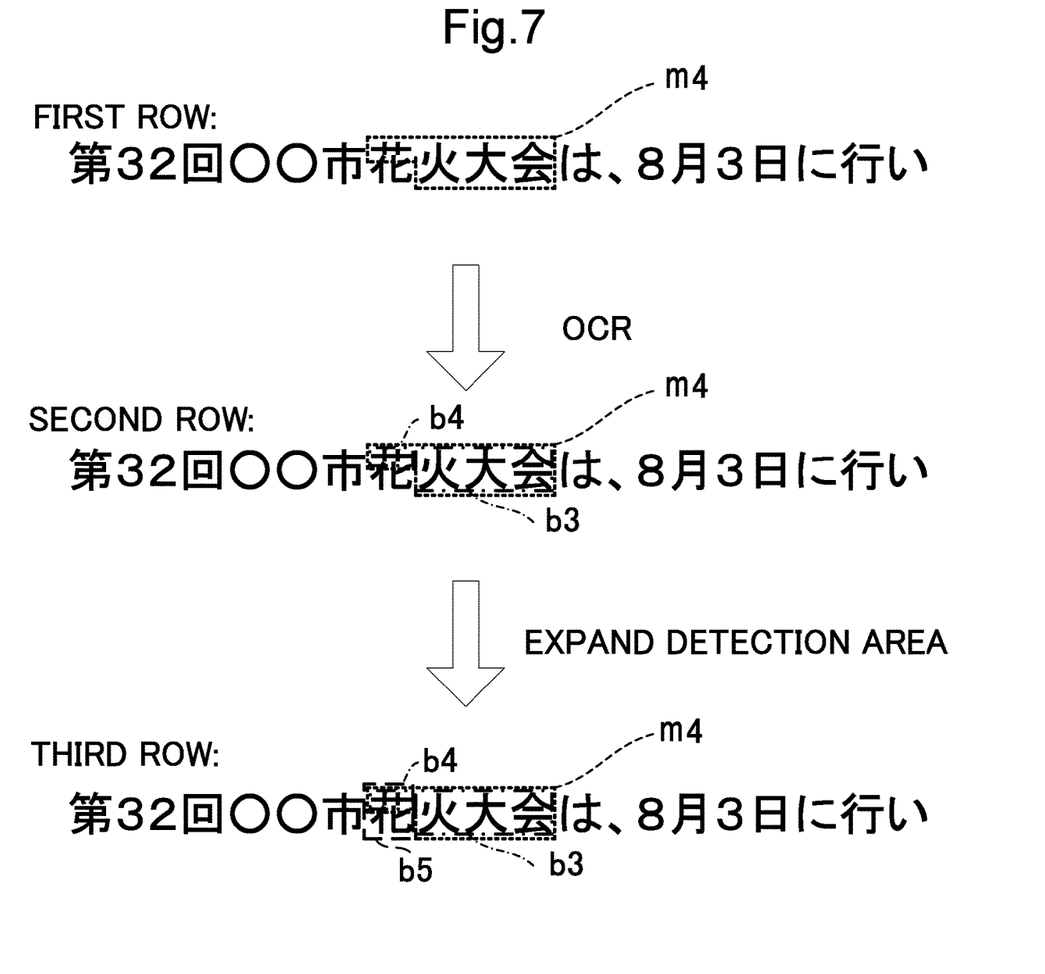
FIG. 7 is a view showing examples of a marker portion, a detection area, and an expanded detection area.

Steps S30 to S34 will be described in further detail with reference to FIG. 7. FIG. 7 is a view showing examples of a marker portion, a detection area, and an expanded detection area.

In the example shown in FIG. 7, as shown in the first row, a marker portion m4 is placed so that the bounds indicated by the marker portion m4 do not overlap with a character string "火大会" but overlap with a character "花".

When performing OCR processing on the area defined by the marker portion m4 shown in the first row of FIG. 7, the OCR processing section 106 successfully detects the character string "火大会". As a result, an area defined by the dot-and-dash line b3 shown in the second row of FIG. 7 becomes an area where characters have been successfully detected. On the other hand, the detection of the character "花" is failed.

In this case, the OCR processing section 106 determines whether or not a line or lines having caused failure in detection of any character constitute a radical. In the example shown in the second row of FIG. 7, the OCR processing section 106 finds out that the lines contained in an area b4 where the detection of any character has been failed constitute kusakanmuri. Then, the OCR processing section 106 determines that the kanji's constituent lines other than the kusakanmuri are located under the kusakanmuri and expands the detection area by expanding the area b4 where the detection of any character has been failed downward. As a result, an area defined by the broken line b5 shown in the third row of FIG. 7 becomes a new detection area. The OCR processing section 106 performs OCR processing again on the new detection area b5. Because the bounds of the new detection area b5 do not overlap with the character "花", the OCR processing section 106 can detect the character "花" which could not be detected in the initial OCR processing.

As thus far described, in the image forming apparatus according to Modification 1, it is determined whether or not a line or lines having caused failure in detection of any character constitute a character element, such as a radical. Thus, it can be determined whether or not the line or lines having caused failure in detection of any character are a part of a character.

Modification 2

In an image processing apparatus according to Modification 2, the OCR processing section 106 expands the detection area by a predetermined length in a direction where the other part of the character to be identified is assumed to be present and performs OCR processing again on the detection area expanded by the predetermined length. Then, when failing to identify the character represented by line images even in the second round of OCR processing, the OCR processing section further expands the detection area by the predetermined length in the direction where the other part of the character to be identified is assumed to be present and performs OCR processing again on the detection area further expanded by the predetermined length.

As thus far described, in the image processing apparatus according to Modification 2, the processing for expanding the detection area by the predetermined length is performed until the character represented by line images can be identified. Therefore, even if the area where OCR processing is to be performed is specified to overlap with characters, all the characters in the user's desired area can be extracted.

Modification 3

In an image processing apparatus according to Modification 3, when the OCR processing section 106 has failed to identify the character represented by line images even though having performed the OCR processing again on the expanded detection area, the OCR processing section 106 performs OCR processing on the detection area before being expanded.

When a character cannot be identified despite expansion of the detection area, it can be considered that in the previous OCR processing the character could not be identified because of some sort of error. In this case, the image processing apparatus according to Modification 3 performs OCR processing on the detection area before being expanded. This enables the identification of the character that could not be identified because of some sort of error in the previous OCR processing.

Note that in OCR processing lines (line image) contained in the detection area are detected by subjecting the detection area to edge detection. There are various methods for performing edge detection, including a method in which the processing time is short but the accuracy of edge detection is relatively low (first method) and a method in which the processing time is long but the accuracy of edge detection is high (second method). The OCR processing section 106 may perform edge detection according to the first method in the initial OCR processing and perform edge detection according to the second method in the second and subsequent rounds of OCR processing.

Modification 4

In an image processing apparatus according to Modification 4, when the OCR processing section 106 has failed to identify the character represented by line images even though having performed the OCR processing again on the expanded detection area, the OCR processing section 106 narrows the expanded detection area by a predetermined length and performs OCR processing on the narrowed detection area. Then, when failing to identify the character represented by line images even in the above OCR processing, the OCR processing section further narrows the detection area by the predetermined length and performs OCR processing again on the further narrowed detection area.

When a character cannot be identified despite expansion of the detection area, it can be considered that in the previous OCR processing the character could not be identified because of some sort of error. In this case, the image processing apparatus according to Modification 4 narrows the detection area by a predetermined length and performs OCR processing again on the narrowed detection area. This enables the identification of the character that could not be identified because of some sort of error in the previous OCR processing.

<Supplement 1>

Figure 8A:
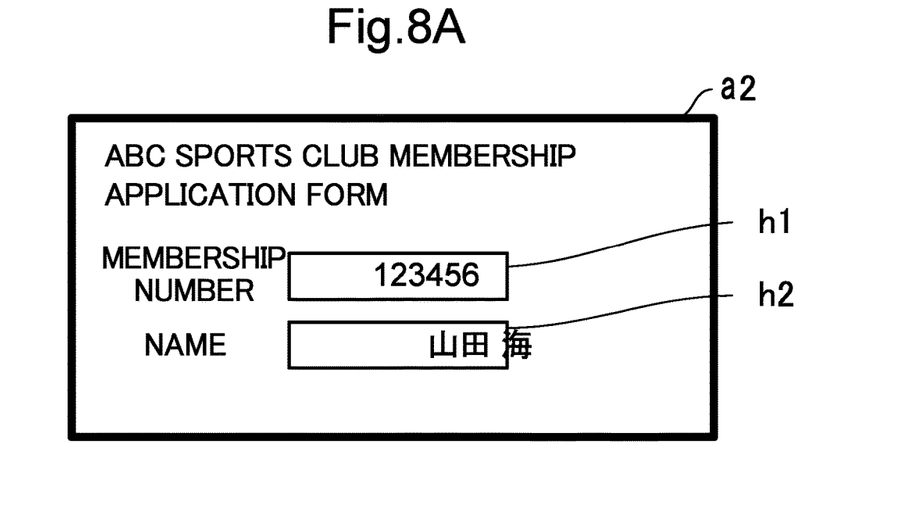
FIG. 8A is a view showing an example of a document to be processed by an image forming apparatus according to a supplement and FIG. 8B is a view showing examples of a detection area and an expanded detection area.

Although the description in the above embodiment and modifications has been given of the case where the detection area to be subjected to OCR processing is specified by marking using a marker pen, the present disclosure is not necessarily limited to this case. In an image forming apparatus according to Supplement 1, the detection area to be subjected to OCR processing is previously determined. FIG. 8A is a view showing an example of a document to be processed by the image forming apparatus 10. A document a2 is provided with character entry boxes h1 and h2 and the insides of the character entry boxes h1 and h2 are previously determined as detection areas to be subjected to OCR processing. The user fills in the character entry boxes h1 and h2 on the document a2 by hand. Therefore, characters may be carelessly written to overlap with the frames of the character entry boxes h1 and h2. In the example shown in FIG. 8A, a character "海" overlaps with the frame of the character entry box h2.

Figure 8B:
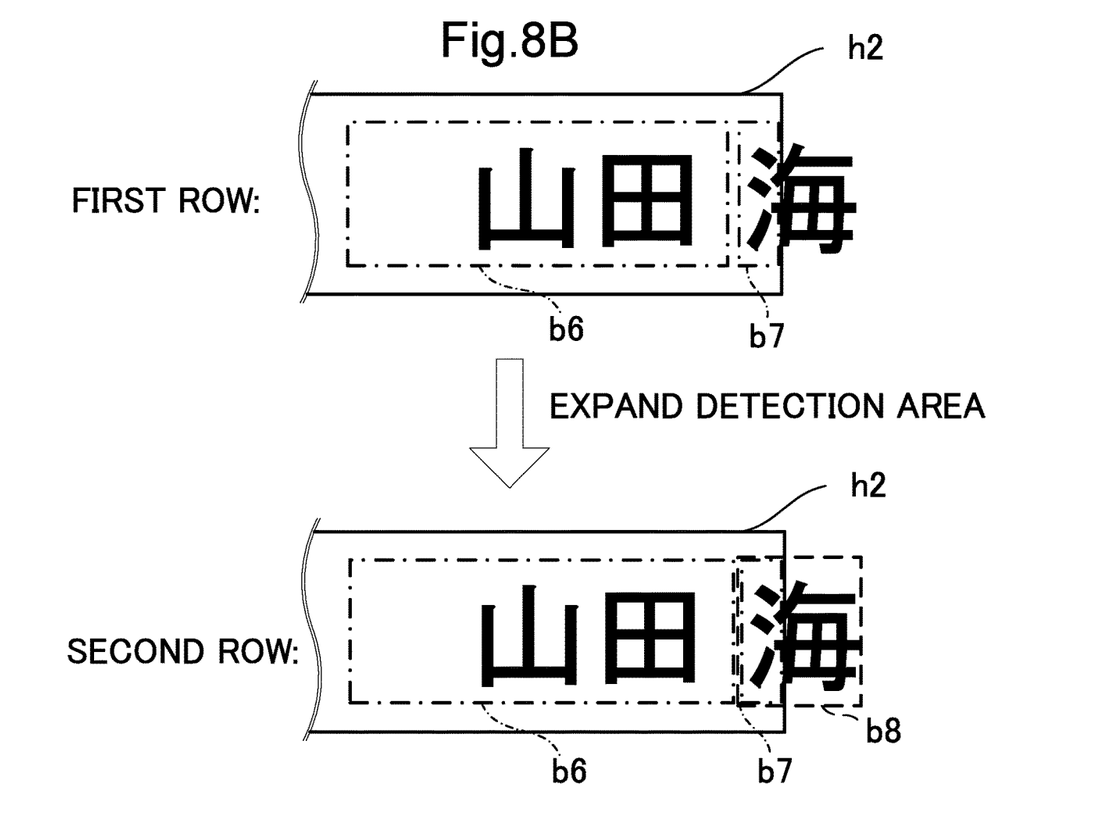

When performing OCR processing on the area defined by the character entry box h1 shown in the first row of FIG. 8B, the OCR processing section 106 successfully detects a character string "山田". As a result, an area defined by the dot-and-dash line b6 shown in the first row of FIG. 8B becomes an area where characters have been successfully detected. On the other hand, the detection of the character "海" is failed.

In this case, the OCR processing section 106 determines whether or not a line or lines having caused failure in detection of any character constitute a radical. In the example shown in the first row of FIG. 8B, the OCR processing section 106 finds out that the lines contained in an area b7 where the detection of any character has been failed constitute sanzui. Then, the OCR processing section 106 determines that the kanji's constituent lines other than the sanzui are located on the right of the sanzui and expands the detection area by expanding the area b7 where the detection of characters has been failed to the right. As a result, an area defined by the broken line b8 shown in the second row of FIG. 8B becomes a new detection area. The OCR processing section 106 performs OCR processing again on the new detection area b8. Because the bounds of the new detection area b8 do not overlap with the character "海", the OCR processing section 106 can detect the character "海" which could not be detected in the initial OCR processing.

<Supplement 2>

Although the description in the above embodiment and modifications has been given of the case where texts described mainly in hiragana and kanji characters are subjected to OCR processing, the present disclosure is not necessarily limited to this case. The following is a description of the case where the image processing apparatuses according to the above embodiment and modifications are applied for alphabetical letters.

Figure 9:
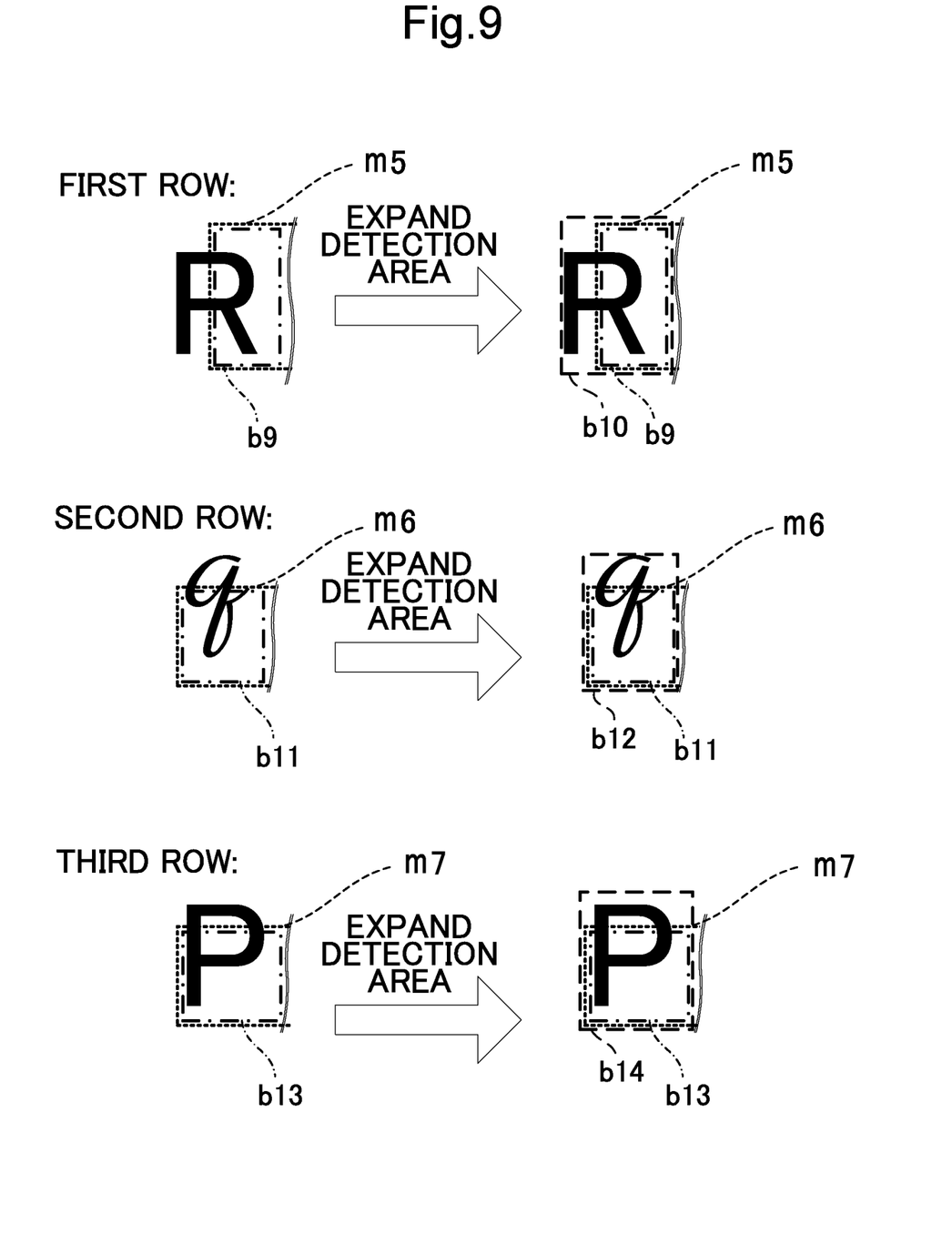
FIG. 9 is a view showing examples of a marker portion, a detection area, and an expanded detection area.

In an example shown in the first row of FIG. 9, the letter "R" overlaps with a detection area defined by a marker portion m5. Therefore, the OCR processing section 106 fails to detect a letter in consideration only of lines forming the right side of "R" defined by the dot-and-dash line b9 in the figure.

Meanwhile, the character database stored in the storage section 160 contains positional information on the positions of line segments forming each of alphabetical letters, such as "R", "q", and "P", (inclusive of information on vectorization of alphabetical letter loci, information on the positions of intersections between lines, and information on the positions of end points of lines). The OCR processing section 106 refers to this character database to determine whether or not there is an alphabetical letter of which the degree of similarity in position to the right side of "R" defined by the dot- and dash line b9 is equal to or greater than a predetermined value. When there is an alphabetical letter having a degree of similarity equal to or greater than the predetermined value, the OCR processing section 106 expands the detection area as shown in the first row of FIG. 9. Then, the OCR processing section 106 performs OCR processing on the expanded detection area b10 to detect the letter "R".

Also in examples shown in the second and third rows of FIG. 9, the OCR processing section 106 can detect the letters by performing the same processing as described above. In the second row of FIG. 9, a lower side of the letter "q" is within a marker portion m6. The OCR processing section 106 determines whether or not there is an alphabetical letter of which the degree of similarity in position to the lower side of "q" defined by the dot- and dash line b11 is equal to or greater than the predetermined value. When there is an alphabetical letter having a degree of similarity equal to or greater than the predetermined value, the OCR processing section 106 expands the detection area as shown in the second row of FIG. 9. Then, the OCR processing section 106 performs OCR processing on the expanded detection area b12 to detect the letter "q".

In the third row of FIG. 9, a lower side of the letter "P" is within a marker portion m7. The OCR processing section 106 determines whether or not there is an alphabetical letter of which the degree of similarity in position to the lower side of "P" defined by the dot- and dash line b13 is equal to or greater than the predetermined value. When there is an alphabetical letter having a degree of similarity equal to or greater than the predetermined value, the OCR processing section 106 expands the detection area as shown in the third row of FIG. 9. Then, the OCR processing section 106 performs OCR processing on the expanded detection area b14 to detect the letter "P".

As seen from the above, the image processing apparatuses described in the above embodiment and modifications not only can identify alphabetical letters by OCR but also can identify characters of other languages by OCR by performing the same processing.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An image processing apparatus comprising a control unit,
   the control unit including a CPU, and functioning, when the CPU executes a program, as
       a control section governing overall operation control of the image forming apparatus, and
       an OCR processing section performing OCR processing by identifying a specified area of image data as a detection area, detecting line images contained in the detection area, and analyzing the detected line images to identify a character represented by the line images,
   wherein when failing to identify a character represented by the line images in the OCR processing, the OCR processing section determines whether the line images represent a part of a character and, upon determination that the line images represent a part of a character, expands the detection area in a direction where the other part of the character to be identified is assumed to be present and performs the OCR processing again on the expanded detection area,
   the image processing apparatus further comprises a storage section that contains a character database including loci and relative positions of line segments forming each of a plurality of characters,
   wherein the OCR processing section (i) calculates a degree of similarity of each of the characters contained in the character database to the detected line images based on the loci and relative positions of the line segments; (ii) identifies, as the character represented by the line images, a character the calculated degree of similarity of which is equal to or greater than a predetermined first value; and (iii) identifies, as the character a part of which is represented by the line images, a character the calculated degree of similarity of which is smaller than the first value and equal to or greater than a predetermined second value smaller than the first value.

2. The image processing apparatus according to claim 1, wherein the storage section contains a character database including loci and relative positions of line segments forming each of alphabetical letters.

3. An image processing apparatus comprising a control unit,
   the control unit including a CPU, and functioning, when the CPU executes a program, as
       a control section governing overall operation control of the image forming apparatus, and
       an OCR processing section performing OCR processing by identifying a specified area of image data as a detection area, detecting line images contained in the detection area, and analyzing the detected line images to identify a character represented by the line images,
   wherein when failing to identify a character represented by the line images in the OCR processing, the OCR processing section determines whether the line images represent a part of a character and, upon determination that the line images represent a part of a character, expands the detection area in a direction where the other part of the character to be identified is assumed to be present and performs the OCR processing again on the expanded detection area,
   the image processing apparatus further comprises a storage section that contains a radical database including loci and relative positions of line segments forming each of radicals making up kanji, including hen, tsukuri, kanmuri, ashi, kamae, tare, and nyou radicals,
   wherein the OCR processing section calculates a degree of similarity of each of the radicals contained in the radical database to the detected line images based on the loci and relative positions of the line segments and, in the presence of a radical the calculated degree of similarity of which is equal to or greater than a predetermined third value, the OCR processing section identifies the radical as a radical represented by the line images and determines that the line images represent a part of a character.

4. The image processing apparatus according to claim 3, wherein when identifying the radical represented by the line images, the OCR processing section determines, based on which of hen, tsukuri, kanmuri, ashi, kamae, tare, and nyou radicals is the identified radical, the direction where the other part of the character to be identified is assumed to be present and expands the detection area in the determined direction.

5. An image processing apparatus comprising a control unit,
    the control unit including a CPU, and functioning, when the CPU executes a program, as
        a control section governing overall operation control of the image forming apparatus, and
        an OCR processing section performing OCR processing by identifying a specified area of image data as a detection area, detecting line images contained in the detection area, and analyzing the detected line images to identify a character represented by the line images,
    wherein when failing to identify a character represented by the line images in the OCR processing, the OCR processing section determines whether the line images represent a part of a character and, upon determination that the line images represent a part of a character, expands the detection area in a direction where the other part of the character to be identified is assumed to be present and performs the OCR processing again on the expanded detection area, and
    when the OCR processing section has failed to identify the character represented by the line images even though having performed the OCR processing again on the expanded detection area, the OCR processing section further performs the OCR processing on the detection area before being expanded.

6. An image processing apparatus comprising a control unit,
    the control unit including a CPU, and functioning, when the CPU executes a program, as
        a control section governing overall operation control of the image forming apparatus, and
        an OCR processing section performing OCR processing by identifying a specified area of image data as a detection area, detecting line images contained in the detection area, and analyzing the detected line images to identify a character represented by the line images,
    wherein when failing to identify a character represented by the line images in the OCR processing, the OCR processing section determines whether the line images represent a part of a character and, upon determination that the line images represent a part of a character, expands the detection area in a direction where the other part of the character to be identified is assumed to be present and performs the OCR processing again on the expanded detection area, and
    when the OCR processing section has failed to identify the character represented by the line images even though having performed the OCR processing again on the expanded detection area, the OCR processing section narrows the expanded detection area by a predetermined length and performs the OCR processing on the narrowed detection area, and
    wherein when failing to identify the character represented by the line images in the OCR processing on the narrowed detection area, the OCR processing section further narrows the detection area by the predetermined length and performs the OCR processing on the further narrowed detection area.

7. An image processing apparatus comprising a control unit,
    the control unit including a CPU, and functioning, when the CPU executes a program, as
        a control section governing overall operation control of the image forming apparatus, and
        an OCR processing section performing OCR processing by identifying a specified area of image data as a detection area, detecting line images contained in the detection area, and analyzing the detected line images to identify a character represented by the line images,
    wherein when failing to identify a character represented by the line images in the OCR processing, the OCR processing section determines whether the line images represent a part of a character and, upon determination that the line images represent a part of a character, expands the detection area in a direction where the other part of the character to be identified is assumed to be present and performs the OCR processing again on the expanded detection area, and
    when expanding the detection area, the OCR processing section further performs the OCR processing again only on an expanded portion of the expanded detection area.

* * * * *